Sept. 15, 1970  D. W. BARKLEY  3,528,725
COLOR TEMPERATURE CORRECTION LIGHT TRANSMITTING FILTER
Filed Aug. 30, 1967  2 Sheets-Sheet 1

INVENTOR.
Dwight W. Barkley
BY Collins & Oberlin
ATTORNEYS

United States Patent Office 3,528,725
Patented Sept. 15, 1970

3,528,725
COLOR TEMPERATURE CORRECTION LIGHT TRANSMITTING FILTER
Dwight W. Barkley, New Kensington, Pa., assignor to Libbey-Owens-Ford Glass Company, Toledo, Ohio, a corporation of Ohio
Filed Aug. 30, 1967, Ser. No. 664,350
Int. Cl. G02b 5/28
U.S. Cl. 350—166                8 Claims

ABSTRACT OF THE DISCLOSURE

A color correction light transmitting filter for modifying the illumination from an artificial light source to render it more compatible to daylight, the filter including a transparent substrate to which is applied a multi-layer coating consisting of alternate layers of high and low index materials.

---

The present invention relates to a heat-resistant light filter capable of modifying the color characteristics of artificial light from a high temperature incandescent lamp so as to produce a resultant illumination having color characteristics approximately equivalent to daylight.

More particularly, the invention relates to a transparent coated glass filter which may be used to modify illumination from an artificial light source to render it compatible with daylight for lighting in the photography of moving pictures, television scenes, and the like.

The photosensitive films used for daylight color photography are used to best advantage with daylight illumination characterized by a color temperature of approximately 5500° K. When daylight color film is used with uncorrected illumination from an artificial light source, such as a tungsten filament lamp, poor color reproduction is obtained. The use of daylight type film may be extended to applications where only artificial light is available or where daylight is available in limited amounts and must be supplemented by artificial light sources by filtering or selectively transmitting the artificial light so as to correct the color temperature of the light to an apparent color temperature of about 5500° K. Such correction may be accomplished by means of filters placed over the lens of the camera. However, such filters have been found to be not only inconvenient but also tend to interfere with the full efficiency of the lens of the camera.

There has come into popular use for photographic illumination a new type of tungsten filament incandescent lamp. The inclusion of a small amount of iodine in this lamp results in an "iodine regenerative cycle" which continuously removes evaporated tungsten "blackening" from the bulb walls, so that light output and color quality remain almost constant through lamp life. Tungsten-iodine lamps can be operated at higher temperatures than the tungsten filament lamps previously employed for photographic illumination. The higher operating temperature of this tungsten-iodine lamp offers the advantage of a greater amount of illumination per watt of power consumed. The illumination from the tungsten-iodine lamp is characterized by a color temperature of approximately 3200° K. which must be corrected to an apparent color temperature of about 5500° K. if it is to be used to best advantage with daylight color film.

It is accordingly an object of this invention to provide a heat-resistant color correcting filter which may be used to modify illumination from an artificial light source to render it compatible with daylight color film.

Another object of the invention is to provide a coated glass filter having light transmission characteristics capable of enhancing apparent color temperature of a light source.

Another object of the invention is to provide such a filter that will correct the color temperature of a tungsten-iodine lamp to approximately 5500° K. and thereby render it approximately equivalent to daylight.

These and other objects of the invention are accomplished by a light filter adapted to be employed in combination with a source of energy and which comprises a transparent carrier and coating means thereon capable of increasing the apparent color temperature of illumination from the light source to that approximating daylight. The carrier may be of any suitable transparent material, but it has been found that glass of a heat-resisting type is preferable. While the coatings may be of any desired material, it is preferable that they be of the type known in the industry as "dichroics" and "multi-films" or "multi-layer," such coatings being capable of reflecting certain radiant energies while transmitting other radiant energies. Such coatings are also sometimes termed "thermal evaporative" or "vacuum deposited" coatings.

Other objects and advantages of the invention will be apparent from the following detailed disclosure taken in conjunction with the accompanying drawings, in which.

Figure 3:
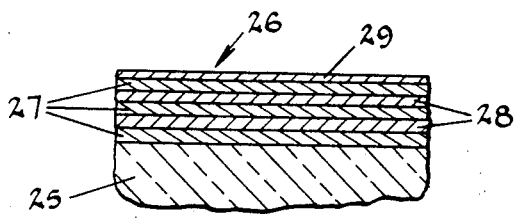
Figure 4:
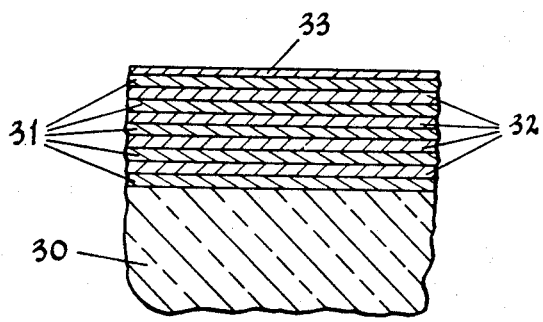
Figure 5:
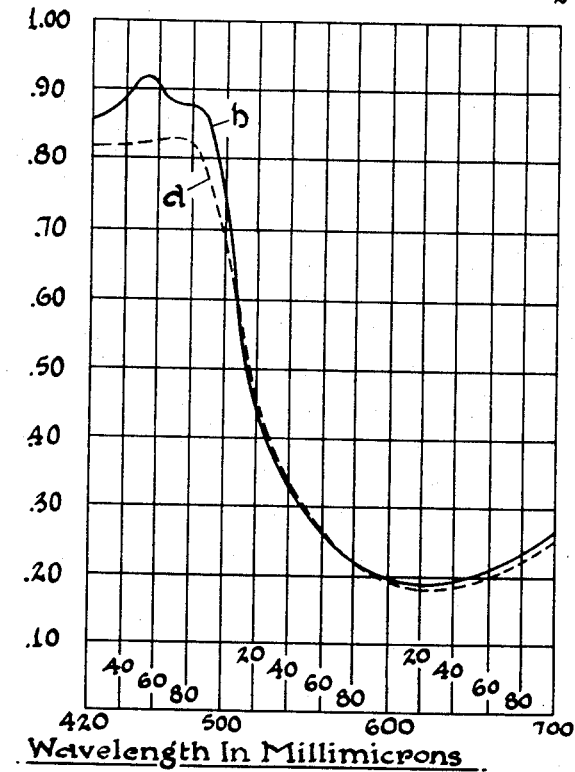
Figure 6:
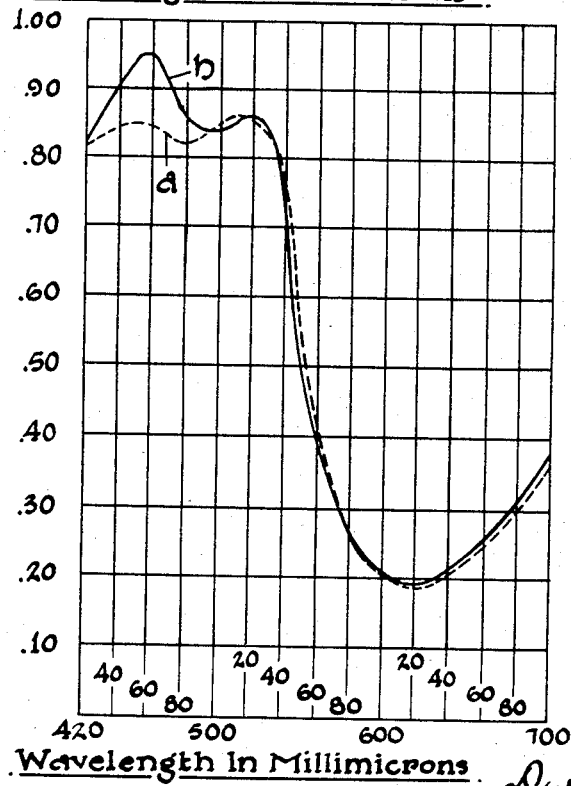

FIGS. 3 and 4 are diagrammatic views illustrating, respectively, a six-layer and a ten-layer color correction filter provided by the invention; and FIGS. 5 and 6 are spectral curves showing the transmission characteristics of the six-layer coating and ten-layer coating of FIGS. 3 and 4, respectively.

Figure 1:
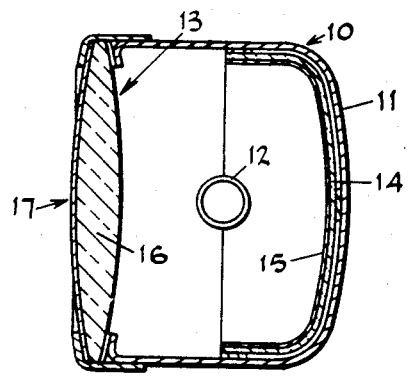
FIG. 1 is a sectional view of a light fixture showing one form of light filter provided by the present invention.

Referring to FIG. 1, there is shown a light fixture 10 including a housing 11 for a source of radiant energy 12, and in the front of which is fitted the color correcting light filter 13 of the present invention. Disposed forwardly of the rear wall of the housing is a reflector comprising a backing 14 of Pyrex or other heat-resisting glass having its front surface provided with an aluminum or other reflective coating 15.

The light filter 13, forming a closure for the open front of the housing 11, comprises a double-convex lens carrier or substrate 16 to the outer surface of which a multi-layer color correcting coating 17 is applied.

The source of radiant energy 12 may be and preferably is, an incandescent lamp of the above mentioned tungsten-iodine type, the apparent color temperature of which is about 3200° K.

The reflector receiving the illumination from the lamp 12 produces a light column that is directed forwardly through the filter 13 which alters the apparent color temperature of the light transmitted from about 3200° K. to about 5500° K. which is approximately equivalent to daylight. In other words, the filter converts the tungsten source of the lamp into a daylight source. The color correction will, of course, vary depending on the color temperature of the light source.

Figure 2:
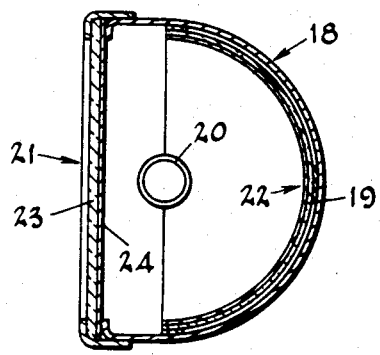
FIG. 2 is a similar view showing another form of light filter embodying the invention.

In FIG. 2 is illustrated a modified type of light fixture 18 in which the housing is designated 19, the source of radiant energy 20 and the light filter 21. The housing is of semi-cylindrical cross-section and is lined with a reflector 22 which may be the same as the reflector in FIG. 1.

The light filter 21 comprises a flat carrier or substrate 23 of Pyrex or other heat-resisting glass to the inner surface of which is applied a color correcting coating 24.

The source of radiant energy 20 may also consist of an incandescent lamp of the tungsten-iodine type and the light filter 21 functions in the same way as the light filter 13 in FIG. 1 to increase the apparent color of the light passing therethrough from around 3200° K. to around 5500° K.

The color corrective coating 17 of FIG. 1 and the coating 21 of FIG. 2 is a multi-layer coating in which the number of layers employed may be varied depending upon the materials used. In all cases, however, the coating consists of alternate layers of transparent high and low index materials applied in a thickness of one-quarter wave length of 600 to 650 m$\mu$ (millimicrons) light plus one additional layer of a low index material in a thickness of one-quarter wave length of 450 m$\mu$. The final layer of low index material constitutes a very important feature of this invention as it increases the percentage of light transmission of the coating and functions to match the color correction desired to be obtained from the light source.

By way of example, there is shown in FIG. 3 a six-layer coating and in FIG. 4 a ten-layer coating, both of which incorporate the principles of the present invention. With reference particularly to FIG. 3, the transparent carrier or substrate of the filter is indicated at 25, with the color correcting coating 26 consisting of five one-quarter wave layers at 600 to 650 m$\mu$ and one-quarter wave layer at 450 m$\mu$. The five layers at 600 and 650 m$\mu$ consist of alternating high and low index materials, with the sixth layer being of a low index material. The most satisfactory high index materials are $TiO_2$ (titanium dioxide), $ZrO_2$ (zirconium dioxide), ZnS (zinc sulphide) and $SbS_3$ (antimony tri-sulphide), while the most satisfactory low index materials are $MgF_2$ (magnesium fluoride), $SiO_2$ (quartz) and Cryolite.

More particularly, the six-layer coating of FIG. 3 consists of three layers 27 of a high index material, such as titanium dioxide ($TiO_2$), and two alternate layers 28 of a low index material such as magnesium fluoride ($MgF_2$). The five layers 27 and 28 are applied in a thickness of one-quarter wave of 600 to 650 m$\mu$. There is then applied to the final layer of $TiO_2$ a layer 29 of $MgF_2$ of a thickness of one-quarter wave of 450 m$\mu$. This final layer is of great significance in that it functions in conjunction with the prior five layers resulting in an augmented blue-green light transmission attenuating the yellow-red light transmission. That is, the filter preferably has a reflection of about 80% in the yellow-red and 90% transmission in the blue-green, with maximum transmission at 450 m$\mu$.

The transmission characteristics of a filter having the multi-layer coating of FIG. 3 is shown by the spectral curve in FIG. 5. The broken line curve $a$ represents the transmission characteristics of a coating composed of the five alternate layers of $TiO_2$ and $MgF_2$, and it will be seen that transmission of such a coating at 450 m$\mu$ is approximately 82%. On the other hand, the full line curve $b$ shows the percent transmission of the filter provided by the invention after the final layer of $MgF_2$ has been applied at 450 m$\mu$ on top of the last layer of $TiO_2$. As will be seen, the addition of this final layer of low index material results in a substantial increase in the light transmission of the filter from approximately 82% to approximately 92%, or an increase of about 10%. This increased light transmission directly augments the daylight output of the lamp. It also more correctly balances the red and blue output of the source to daylight energy.

In FIG. 4 is shown a ten-layer coating applied to a transparent carrier or substrate 30. The first nine layers consist of five layers 31 of a high index material such as aluminum oxide ($Al_2O_3$) and four alternate layers 32 of a low index material, such as magnesium fluoride ($MgF_2$). All nine layers are applied in a thickness of one-quarter wave of 600 to 650 m$\mu$ (millimicrons). To the last layer 31 of $Al_2O_3$ there is applied a final layer 33 of $MgF_2$ in a thickness of one-quarter wave of 450 m$\mu$. The transmission characteristics of this coating are shown by the spectral curve in FIG. 6. The broken line curve $a$ indicates the percent transmission of a multi-layer coating including only the first nine alternate layers of $Al_2O_3$ and $MgF_2$, with a light transmission of approximately 85% at 450 m$\mu$. However, after the final layer 33 of $MgF_2$ has been applied, the light transmission of the filter is increased to approximately 95% as shown by the full line curve or a substantial increase of about 10%.

Either the six-layer coating of FIG. 3 or the ten-layer coating of FIG. 4 may be used with the double-convex lens of FIG. 1 or with the flat plate 23 of FIG. 2. The successive layers of either coating are preferably deposited on the carrier or substrate by well known thermal evaporation or vacuum deposition procedures.

The above examples are illustrative of the present invention and are not intended to be limitive thereof. Thus, different combinations of high and low index materials in one-quarter wave thicknesses may be employed to obtain the desired optical properties in the filter. The number of layers required to obtain the desired optical properties will depend upon the refractive indices of the materials used to obtain the desired color correction. For instance, in the six-layer coating of FIG. 3 the refractive indices of titanium dioxide and magnesium fluoride are approximately 2.3 and 1.38, respectively, with the difference being .92. On the other hand, the difference between the refractive indices of aluminum oxide and magnesium fluoride, which are approximately 1.77 and 1.38, respectively, is .4. Thus, in order to obtain a filter using alternate layers of aluminum oxide and magnesium fluoride having optical properties comparable with the six-layer coating of FIG. 3, it becomes necessary to program an increased number of layers into the coating as in FIG. 4. In both the six-layer filter and the ten-layer filter described above, there is approximately 80% attenuation of the 600 to 650 m$\mu$ light, leaving approximately 20% light transmission in this region as shown in FIGS. 5 and 6. The result of this, as pointed out above, is that the filter cuts out the undesired red-yellow and enhances the blue-green light.

Accordingly, it is to be understood that the forms of the invention herein shown and described are to be taken as preferred embodiments only and that various procedural changes as well as changes in the size, shape and arrangement of parts can be resorted to without departing from the spirit of the invention as defined in the following claims.

I claim:

1. A color correction light transmitting filter, comprising a transparent substrate and a multi-layer coating applied to a major surface thereof, said coating consisting essentially of alternate layers of high index and low index materials of an optical thickness of one-quarter wavelength of light rays in the spectral region of 600 m$\mu$ to 650 m$\mu$, with the first and last layers being of a high index material and the first layer being disposed on the said substrate surface, and a final layer of a low index material applied to the last layer of high index material, said final layer having an optical thickness of one-quarter wavelength of light rays in the spectral region of about 450 m$\mu$ the number and thickness of said layers being such that the filter is capable of altering the apparent color temperature of an incandescent light source from about 3200° K. to about 5500° K.

2. A color correction light transmitting filter as defined in claim 1, in which the number and thickness of said layers are such that the filter has a spectral transmission in exces of 90% at 450 m$\mu$, with about 20% transmission at about 625 m$\mu$.

3. A color correction light transmitting filter as defined in claim 1, in which the high index layers are a metallic oxide and the low index layers are a metallic fluoride.

4. A color correction light transmitting filter as defined in claim 3, in which the metallic oxide is titanium dioxide and the metallic fluoride is magnesium fluoride.

5. A color correcton light transmitting filter as defined in claim 3, in which the metallic oxide is aluminum oxide and the metallic fluoride is magnesium fluoride.

6. A color correction light transmitting filter as defined in claim 1, in which the high index layers are a metallic oxide and the low index layers are quartz.

7. A color correction light transmitting filter as defined in claim 6, in which the metallic oxide is titanium dioxide.

8. A color correction light transmitting filter as defined in claim 1, in which the high index layers are a metallic sulphide and the low index layers are quartz.

References Cited

UNITED STATES PATENTS

| | | | |
|---|---|---|---|
| 2,660,925 | 12/1953 | Turner | 350—166 X |
| 2,852,980 | 9/1958 | Schroder | 350—166 X |
| 3,334,217 | 8/1967 | Bickler et al. | 350—1 X |
| 3,410,625 | 11/1968 | Edwards | 350—1 X |
| 3,423,147 | 1/1969 | Thelen | 350—166 |

DAVID SCHONBERG, Primary Examiner

T. H. KUSMER, Assistant Examiner

U.S. Cl. X.R.

350—311

PO-1050
(5/69)

UNITED STATES PATENT OFFICE
CERTIFICATE OF CORRECTION

Patent No. 3,528,725     Dated September 15, 1970

Inventor(s) Dwight W. Barkley

It is certified that error appears in the above-identified patent and that said Letters Patent are hereby corrected as shown below:

Col. 3, line 23, after "and" insert --one--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents